(12) United States Patent
Mizumoto et al.

(10) Patent No.: US 9,570,764 B2
(45) Date of Patent: Feb. 14, 2017

(54) FUEL CELL SYSTEM AND METHOD OF OPERATING FUEL CELL SYSTEM

(71) Applicant: HONDA MOTOR CO., LTD., Tokyo (JP)

(72) Inventors: Kazuya Mizumoto, Saitama (JP); Satoshi Inoue, Saitama (JP); Koichi Takaku, Saitama (JP); Nobutaka Nakajima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/832,303

(22) Filed: Aug. 21, 2015

(65) Prior Publication Data

US 2016/0056484 A1 Feb. 25, 2016

(30) Foreign Application Priority Data

Aug. 25, 2014 (JP) .................................. 2014-170836
Jun. 8, 2015 (JP) .................................. 2015-116115

(51) Int. Cl.
*H01M 8/04* (2016.01)
*B60L 1/00* (2006.01)
(Continued)

(52) U.S. Cl.
CPC .......... *H01M 8/04089* (2013.01); *B60L 1/003* (2013.01); *B60L 3/0053* (2013.01); *B60L 11/1803* (2013.01); *B60L 11/1883* (2013.01); *B60L 11/1885* (2013.01); *H01M 8/04201* (2013.01); *H01M 8/04302* (2016.02); *H01M 8/04303* (2016.02); *H01M 8/04365* (2013.01); *H01M 8/04388* (2013.01); *H01M 8/04641* (2013.01); *B60L 2210/10* (2013.01); *B60L 2240/36* (2013.01); *B60L 2240/662* (2013.01);
(Continued)

(58) Field of Classification Search
CPC ..................... H01M 8/04089; H01M 8/04388; H01M 8/04303; H01M 8/04302; H01M 8/04365; H01M 8/04641; H01M 8/04201
See application file for complete search history.

(56) References Cited

U.S. PATENT DOCUMENTS

2009/0029226 A1* 1/2009 Yamagishi .......... B60L 11/1881
429/414
2009/0130510 A1* 5/2009 Ishikawa ........... H01M 8/04089
429/411
(Continued)

FOREIGN PATENT DOCUMENTS

JP 2007-165186 A 6/2007

*Primary Examiner* — Stewart Fraser
(74) *Attorney, Agent, or Firm* — Squire Patton Boggs (US) LLP

(57) ABSTRACT

An object of the present invention is to provide a fuel cell system and a method of operating the fuel cell system which is difficult to give an uncomfortable feeling to a driver or passenger by operation sound of the injector while satisfactorily discharging water. The fuel cell system includes a fuel cell stack having an anode flow path, an injector for supplying hydrogen at a predetermined drive cycle toward the anode flow path by being opened, and an ECU for controlling the injector, wherein the ECU performs a valve opening time extension step in which hydrogen is supplied in a valve opening time longer than that in next and previous drive cycles.

20 Claims, 7 Drawing Sheets

(51) Int. Cl.
    *B60L 3/00*           (2006.01)
    *B60L 11/18*         (2006.01)
    *H01M 8/10*         (2016.01)

(52) U.S. Cl.
    CPC ... *B60L 2250/26* (2013.01); *H01M 2008/1095* (2013.01); *H01M 2250/20* (2013.01); *Y02T 10/7216* (2013.01); *Y02T 10/7291* (2013.01); *Y02T 90/16* (2013.01); *Y02T 90/32* (2013.01); *Y02T 90/34* (2013.01)

(56) References Cited

U.S. PATENT DOCUMENTS

| | | | | |
|---|---|---|---|---|
| 2010/0239935 | A1* | 9/2010 | Katano | B60L 11/1881 429/443 |
| 2010/0279193 | A1* | 11/2010 | Yamagishi | B60L 11/1881 429/444 |
| 2012/0214079 | A1* | 8/2012 | Suematsu | H01M 8/04291 429/444 |
| 2014/0147760 | A1* | 5/2014 | Ohgami | H01M 8/04097 429/415 |
| 2014/0212779 | A1* | 7/2014 | Furusawa | H01M 8/04261 429/429 |
| 2014/0212780 | A1* | 7/2014 | Furusawa | H01M 8/04955 429/429 |
| 2015/0125767 | A1* | 5/2015 | Wake | H01M 8/04291 429/414 |
| 2015/0214561 | A1* | 7/2015 | Araki | H01M 8/04231 429/414 |

* cited by examiner

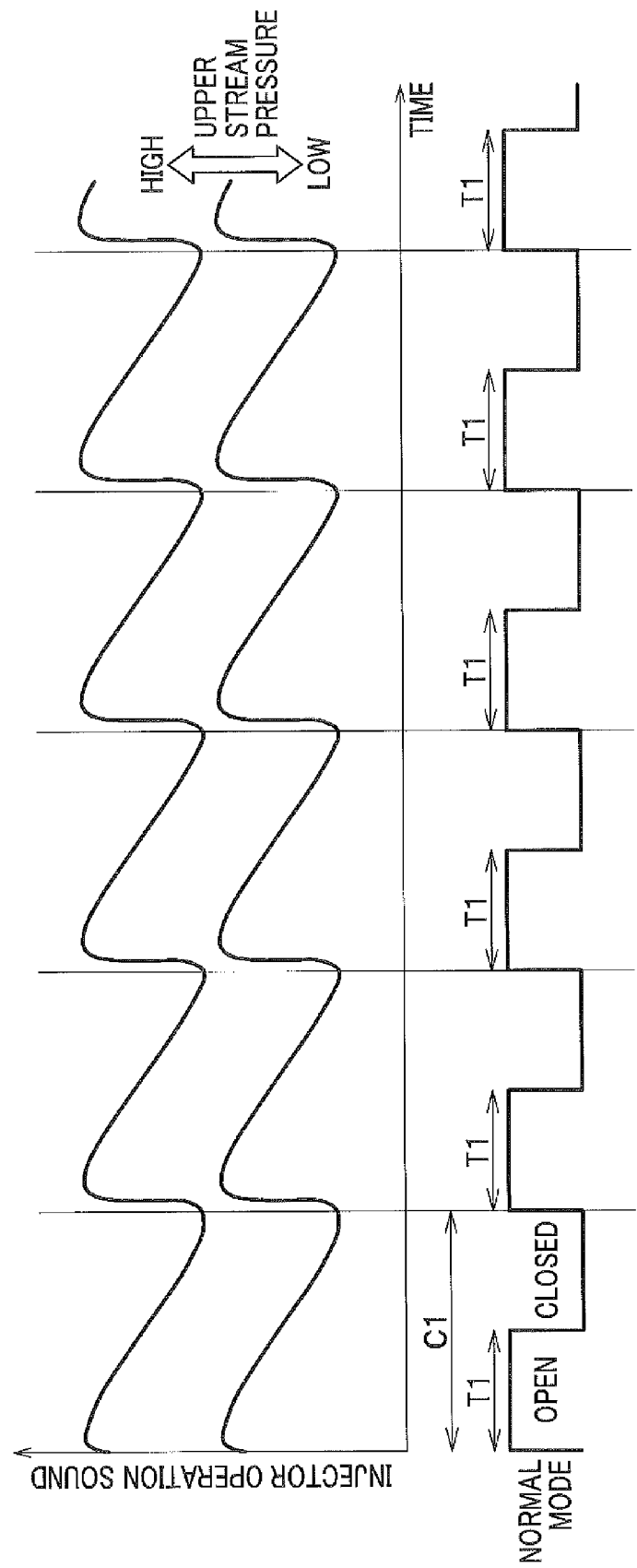

FUEL CELL SYSTEM AND METHOD OF OPERATING FUEL CELL SYSTEM

CROSS REFERENCE TO RELATED APPLICATIONS

This application claims the foreign priority benefit under Title 35, United States Code, §119 (a)-(d) of Japanese Patent Application No. 2014-170836, filed on Aug. 25, 2014, and Japanese Patent Application No. 2015-116115, filed on Jun. 8, 2015 in the Japan Patent Office, each disclosure of which is herein incorporated by reference in its entirety.

TECHNICAL FIELD

The present invention relates to a fuel cell system and a method of operating the fuel cell system.

BACKGROUND ART

In a fuel cell system constituting a fuel cell electric vehicle or the like, there has been known a technology of injecting hydrogen by an electronically controlled injector, to supply the injected hydrogen to an anode of a fuel cell (see Patent Document 1). Specifically, in Patent Document 1, as a power generation amount of the fuel cell is reduced, that is, as the fuel cell is brought into a low load state, a drive cycle (drive interval) of the injector is made longer while its duty ratio is kept constant, and water in an anode flow path (fuel gas flow path) is discharged to the outside of the fuel cell. The term "power generation amount" of the fuel cell is a generic term including an actual power generation amount by the fuel cell and a requested power generation amount to the fuel cell.

PRIOR ART DOCUMENTS

Patent Literatures

[Patent Document 1]
Japanese Patent Application Publication No. 2007-165186

SUMMARY OF THE INVENTION

Problem to be Solved by the Invention

As in Patent Document 1, when adjusting the drive cycle of the injector while the duty ratio is kept constant in a state where a power generation amount is small (for example, during idling), the length of the drive cycle varies, and further timing of start/end of the drive cycle varies in plural consecutive drive cycles. Therefore, for example, when the injector is configured to be valve opened at the start of each drive cycle, timing of valve open of the injector, i.e., timing of injection start of hydrogen varies in plural consecutive drive cycles.

Here, an operation sound of the injector becomes a maximum at a time of valve open which is a time of injection start of hydrogen in each drive cycle, and is then gradually reduced. Therefore, when the timing of valve open of the injector varies in plural consecutive drive cycles, timing (interval) of generating a maximum operation sound of the injector varies, that is, the sound becomes discontinuous, to give an uncomfortable feeling to a driver or passenger in the fuel cell electric vehicle.

Therefore, an object of the present invention is to provide a fuel cell system and a method of operating the fuel cell system which is difficult to give an uncomfortable feeling to the driver or passenger by the operation sound of the injector while satisfactorily discharging water.

Means to Solve the Problem

As a means for solving the above problems, the present invention is a fuel cell system including a fuel cell having a fuel gas flow path, a fuel gas supply valve for supplying fuel gas at a predetermined drive cycle toward the fuel gas flow path by being opened, and a control unit for controlling the fuel gas supply valve, wherein the control unit performs a valve opening time extension step in which fuel gas is supplied in a valve opening time longer than that in next and previous drive cycles.

With this configuration, when the control unit performs the valve opening time extension step in which fuel gas is supplied in a valve opening time longer than that in next and previous drive cycles, a larger amount of fuel gas than that in the next and previous drive cycles is supplied to the fuel gas flow path in a current drive cycle. Thus, water in the fuel gas flow path is satisfactorily discharged to the outside of the fuel gas flow path. Therefore, it is possible to satisfactorily ensure power generation stability of the fuel cell.

Further, since the valve opening time is longer than that in the next and previous drive cycles without changing valve opening timing, a timing of maximum operation sound which is generated when opening the fuel gas supply valve does not vary, and thus the operation sound does not give an uncomfortable feeling to the driver or passenger.

Further, the control unit preferably performs a first control step of performing fuel supply in a longer valve opening time as a power generation amount is increased at a predetermined drive cycle in a first power generation amount range, a second control step of performing fuel supply in a drive cycle equal to that in the first power generation amount range, in a second power generation amount range less than the first power generation amount range, and a valve opening time extension step in the second control step.

Here, the power generation amount includes an actual power generation amount by the fuel cell and a requested power generation amount to the fuel cell. With this configuration, since the drive cycle of the first control step and the drive cycle of the second control step have the same length as each other, continuity between the operation sound of the fuel gas supply valve in the first control step and the operation sound of the fuel gas supply valve in the second control step is high, and thus it is more difficult to give an uncomfortable feeling to the driver or passenger.

Further, since the second control step is performed in the second power generation amount range less than the first power generation amount range, injection amount of the fuel gas is reduced, and thus water easily stay in the fuel gas flow path, however, it is possible to satisfactorily discharge water staying in the fuel gas flow path by performing the valve opening time extension step in the second control step.

Further, the control unit preferably performs a stop determination step of determining whether or not the fuel cell system is in stop process, and a drive cycle extension step of controlling the fuel gas supply valve in a drive cycle longer than that in the first power generation amount range and the second power generation amount range regardless of power generation amount of the fuel cell, in a case where it is determined that the fuel cell system is in stop process in the stop determination step.

With this configuration, when the control unit determines in the stop determination step that the fuel cell system is in stop process, the control unit performs the drive cycle extension step, and controls the fuel gas supply valve in the drive cycle longer than that in the first power generation amount range and the second power generation amount range regardless of power generation amount of the fuel cell. Thus, since the drive cycle is long, the valve opening time of the fuel gas supply valve is also long, and it is possible to quickly discharge water staying in the fuel gas flow path. Note that, even in a case where the drive cycle of the fuel gas supply valve is long in the drive cycle extension step, since the fuel cell system is in stop process, the driver or passenger does not feel uncomfortable.

Further, the control unit preferably supplies fuel gas at a maximum valve opening time in the drive cycle regardless of power generation amount of the fuel cell during the valve opening time extension step.

The term "a maximum valve opening time in the drive cycle" means a maximum valve opening time in a case where the valve is not continuously open in the entire drive cycle and is opened and closed in the drive cycle. The term "a minimum valve closing time" means a minimum valve closing time in a case where the valve is opened and closed in the drive cycle. That is, it means that a valve opening time is the maximum valve opening time obtained by subtracting the minimum valve closing time from the drive cycle.

With this configuration, since the valve opening time during the valve opening time extension step is the maximum valve opening time in the drive cycle, it is possible to quickly discharge water staying in the fuel gas flow path.

Further, since there is the minimum valve closing time in the drive cycle, the fuel gas supply valve is not continuously open in the entire drive cycle, and is not opened across the current drive cycle and the next drive cycle.

Further, the control unit preferably supplies fuel gas at a maximum valve opening time in which a fuel gas pressure in the fuel gas flow path does not reach an upper limit fuel gas pressure regardless of power generation amount of the fuel cell during the valve opening time extension step.

With this configuration, since the valve opening time is set to a range in which the fuel gas pressure in the fuel gas flow path does not reach the upper limit fuel gas pressure during the valve opening time extension step, it is possible to satisfactorily prevent gas leakage from the fuel gas flow path as well as to increase pulsation of the fuel gas pressure, thereby satisfactorily discharging water in the fuel gas flow path.

Further, the control unit preferably performs a pressure detection step of detecting an actual fuel gas pressure in the fuel gas flow path in downstream of the fuel gas supply valve, and preferably does not perform the valve opening time extension step when the actual fuel gas pressure is continuously equal to or more than the upper limit fuel gas pressure for a predetermined time period.

With this configuration, since the control unit does not perform the valve opening time extension step when the actual fuel gas pressure is continuously equal to or more than the upper limit fuel gas pressure for a predetermined time period, it is possible to prevent the actual fuel gas pressure from being equal to or more than the upper limit fuel gas pressure for more than a predetermined time period.

Further, the control unit preferably performs a warm-up determination step of determining whether or not the fuel cell is warming up, and preferably performs the valve opening time extension step when the fuel cell is warming up.

Here, when the fuel cell is warming up, since the fuel cell is at low temperature, produced water associated with power generation is easily condensed, to stay in the fuel gas flow path. With this configuration, since the control unit performs the valve opening time extension step in a case where it is determined that the fuel cell is warming up in the warm-up determination step, it is possible to quickly discharge water staying in the fuel gas flow path.

Further, the control unit preferably performs the valve opening time extension step when reduction rate or reduction amount of power generation by the fuel cell is equal to or more than a predetermined value.

Here, as the power generation amount is increased, flow rate of the fuel gas supplied to the fuel gas flow path is increased. In other words, as the power generation amount is reduced, the flow rate of the fuel gas supplied to the fuel gas flow path is reduced. Therefore, when the power generation amount is suddenly reduced, the flow rate of the fuel gas is suddenly reduced, and the produced water easily stays in the fuel gas flow path, and thus drainage performance of the produced water is deteriorated.

With this configuration, when reduction rate or reduction amount of power generation by the fuel cell is equal to or more than a predetermined value for determining that the drainage performance of the fuel cell is deteriorated, since the control unit performs the valve opening time extension step, it is possible to quickly discharge water staying in the fuel gas flow path.

Further, the control unit preferably performs an impedance detection step of detecting an actual impedance of membrane constituting the fuel cell, and preferably performs the valve opening time extension step when the actual impedance is equal to or more than a predetermined value.

Here, the impedance (membrane resistance) of the membrane is reduced when water content of the membrane is increased, and is increased when the water content of the membrane is reduced.

With this configuration, when the actual impedance detected in the impedance detection step is equal to or more than the predetermined value, since the control unit performs the valve opening time extension step, it is possible to quickly discharge water staying in the fuel gas flow path.

Further, the control unit preferably periodically performs the valve opening time extension step.

With this configuration, since the control unit periodically performs the valve opening time extension step, it is possible to periodically discharge water in the fuel gas flow path.

As a means to solve the above problems, the present invention is a method of operating a fuel cell system including a fuel cell having a fuel gas flow path, a fuel gas supply valve for supplying fuel gas at a predetermined drive cycle toward the fuel gas flow path by being opened, and a control unit for controlling the fuel gas supply valve, wherein the control unit performs a valve opening time extension step in which fuel gas is supplied in a valve opening time longer than that in next and previous drive cycles.

Advantageous Effects of Invention

According to the present invention, it is possible to provide a fuel cell system and a method of operating the fuel cell system which is difficult to give an uncomfortable feeling to a driver or passenger by the operation sound of the injector while satisfactorily discharging water.

BRIEF DESCRIPTION OF THE DRAWINGS

FIG. 7 is a time chart showing a relationship between an upstream pressure of the injector and the operation sound of the injector.

EMBODIMENTS FOR CARRYING OUT THE INVENTION

An embodiment of the present invention will be described with reference to FIGS. 1 to 7.

<<Configuration of Fuel Cell System>>

Figure 1:
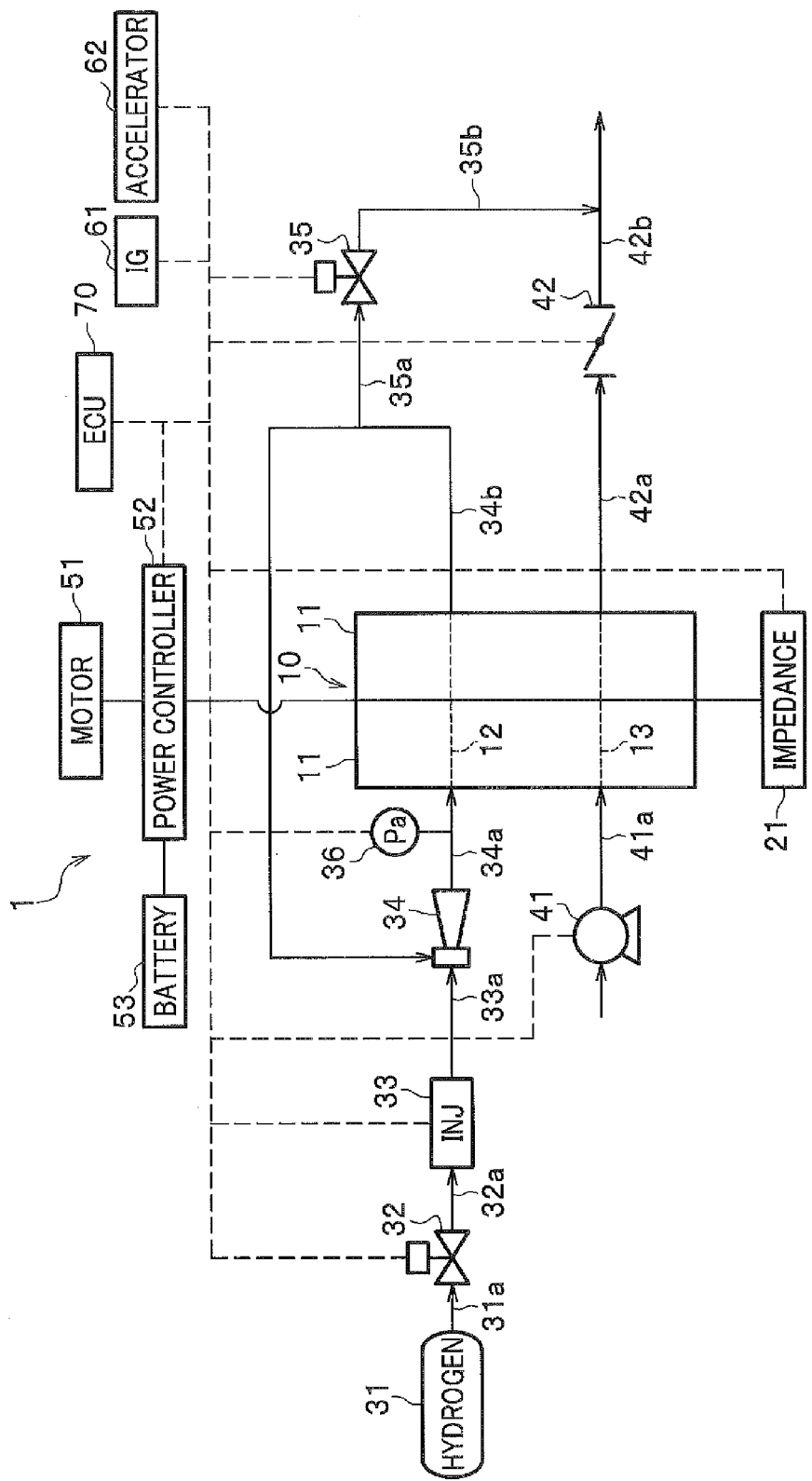
FIG. 1 is a diagram showing a configuration of a fuel cell system according to an embodiment of the present invention.

A fuel cell system 1 according to the present embodiment shown in FIG. 1 is mounted on a fuel cell electric vehicle (moving object). The fuel cell system 1 includes a fuel cell stack 10, an impedance device 21 (impedance detection means), an anode system for supplying and discharging hydrogen (fuel gas, reaction gas) to an anode of the fuel cell stack 10, a cathode system for supplying and discharging air (oxidizing gas, reaction gas) containing oxygen to a cathode of the fuel cell stack 10, a power consumption system for consuming electric power generated by the fuel cell stack 10, and an ECU 70 (Electronic Control Unit) for electronically controlling these components.

<Fuel Cell Stack>

The fuel cell stack 10 is a stack constituted by stacking a plurality (for example, 200 to 400 pieces) of solid polymer unit cells (fuel cells), and the plurality of unit cells are electrically connected in series with each other. Incidentally, two unit cells 11 are shown for descriptive purposes in FIG. 1. Each unit cell 11 includes a MEA (Membrane Electrode Assembly), and an anode separator and a cathode separator having conductivity and sandwiching the MEA.

The MEA includes an electrolyte membrane (solid polymer membrane) made of a monovalent cation exchange membrane (for example, perfluorosulfonic acid type), and an anode and a cathode sandwiching the electrolyte membrane. The anode and the cathode is mainly composed of a porous body such as a carbon paper having conductivity, and contains a catalyst (Pt, Ru or the like) for causing an electrode reaction in the anode and the cathode.

When hydrogen is supplied to each anode, an electrode reaction of formula (1) occurs, and when air is supplied to each cathode, an electrode reaction of formula (2) occurs, so that a potential difference (OCV (Open Circuit Voltage)) is generated in each unit cell. Next, when the fuel cell stack 10 and an external circuit such as a traction motor are electrically connected with each other, and current is obtained, the fuel cell stack 10 is configured to generate electric power.

$$2H_2 \rightarrow 4H^+ + 4e^- \tag{1}$$

$$O_2 + 4H^+ + 4e^- \rightarrow 2H_2O \tag{2}$$

Further, an anode flow path 12 and a cathode flow path 13 are formed in the fuel cell stack 10. The anode flow path 12 and the cathode flow path 13 are respectively formed by a groove or a hole formed in the anode separator and the cathode separator.

<Impedance Device>

The impedance device 21 is a device for detecting impedance of the entire fuel cell stack 10, and is connected to a main terminal of the fuel cell stack 10. Then, the impedance device 21 is configured to output the impedance of the entire fuel cell stack 10 to the ECU 70.

Here, the impedance of the entire fuel cell stack 10 is reduced when water content of the electrolyte membrane is increased, that is, when the electrolyte membrane approaches an over-humidification state. Then, in a case where the actual impedance of the fuel cell stack 10 is equal to or less than a predetermined impedance, it is determined that the fuel cell stack 10 is in the over-humidification state, and water discharge from the anode flow path 12 is required.

<Anode System>

The anode system includes a hydrogen tank 31 (fuel gas supply means), a normally closed shut-off valve 32, an injector 33 (a fuel gas supply valve), an ejector 34, a purge valve 35, and a pressure sensor 36 (fuel gas pressure detection means).

The hydrogen tank 31 is a container in which hydrogen is stored at a high pressure. The hydrogen tank 31 is connected to an inlet of the anode flow path 12 through a pipe 31a, the shut-off valve 32, a pipe 32a, the injector 33, a pipe 33a, the ejector 34, and a pipe 34a. When the shut-off valve 32 is opened by the ECU 70, and the injector 33 injects (discharges) hydrogen, hydrogen in the hydrogen tank 31 is supplied to the anode flow path 12 through the pipe 31a and the like.

The shut-off valve 32 is, for example, an electromagnetic on-off valve which is opened and closed by commands from the ECU 70. The purge valve 35 also has the same configuration.

<Injector>

The injector 33 is an electrically controlled hydrogen injection device for injecting hydrogen by a command from the ECU 70. For example, as described in Japanese Patent Application Publication No. 2013-134882, the injector 33 includes a valve seat formed with a hydrogen injection hole, a plunger for opening and closing the injection hole by reciprocating with respect to the valve seat, a movable core formed of a magnetic material together with the plunger, a compression coil spring for urging the plunger in a closing direction, a fixed core formed of a magnetic material, and a solenoid which is PWM-controlled by the ECU 70 and reciprocates the plunger by exciting the fixed core to suck the movable core.

When the solenoid is turned ON to be energized by a command from the ECU 70, the plunger is retracted to open the injection hole, so that hydrogen is injected. On the other hand, when the solenoid is turned OFF to be de-energized by a command from the ECU 70, the plunger is advanced to close the injection hole, so that hydrogen is blocked.

Further, the injector 33 injects hydrogen so that a pressure and flow rate of hydrogen flowing through the anode flow path 12 is controlled. For example, in the injector 33, as an ON time (injection time of hydrogen, ON duty) in a drive cycle becomes longer, the pressure of hydrogen is increased and the hydrogen flow rate is increased.

Further, when the injector 33 injects hydrogen, an inlet pressure of the anode flow path 12 is increased, so that a pressure difference is temporarily generated between the front and the back of the anode flow path 12. Then, by the pressure difference as a driving force, water in the anode flow path 12 is discharged to a pipe 34b on a downstream side. Note that, as a valve opening time (the ON time) of the injector 33 becomes longer, the pressure difference is increased, so that a time required to discharge water becomes shorter.

<Operation Sound of Injector>

Figure 3:
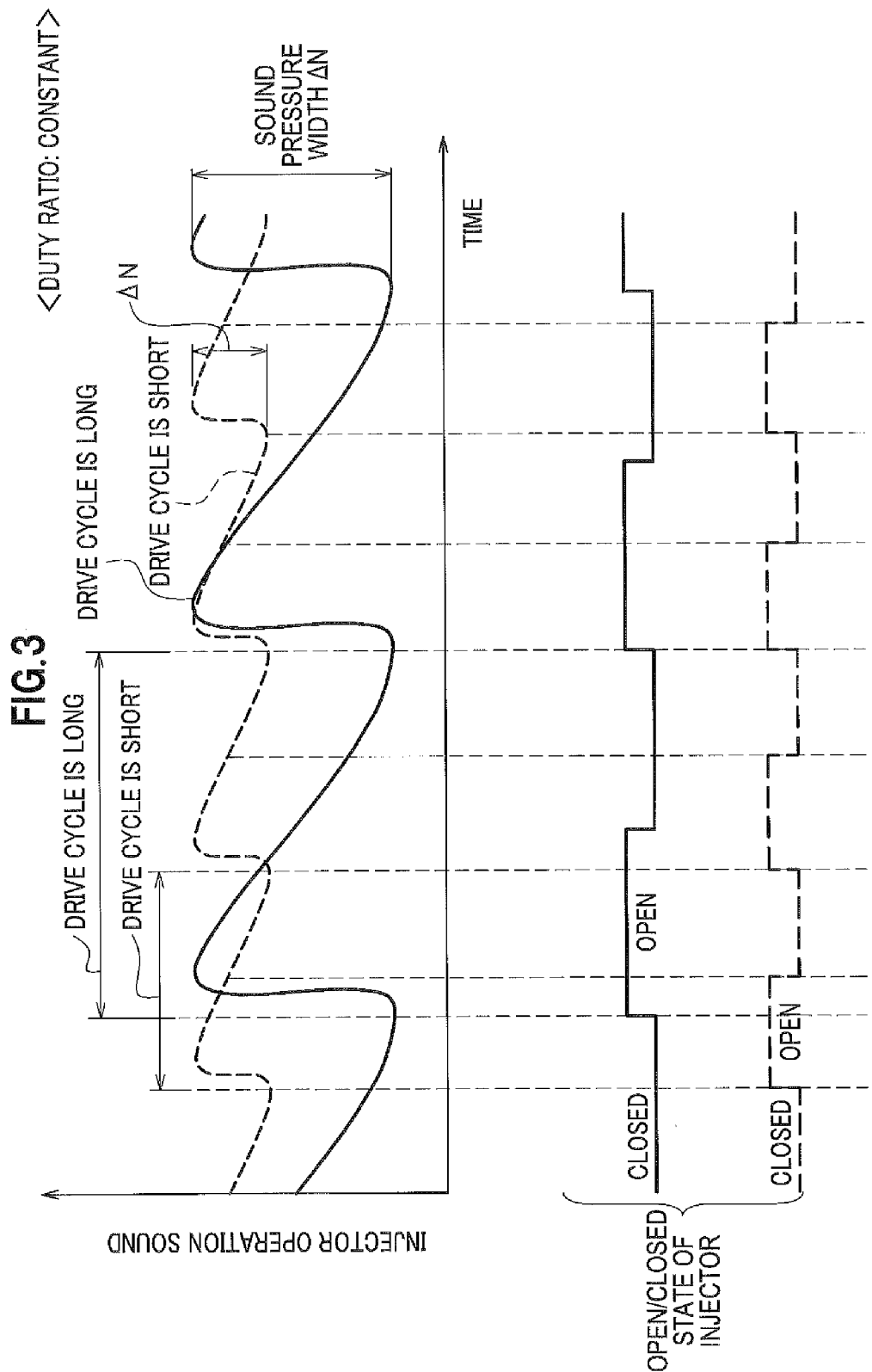
FIG. 3 is a time chart showing a relationship between an operation sound and a drive cycle of an injector in a case where a duty ratio is kept constant.

As shown in FIG. 3, in a case where a duty ratio (ratio of ON time to OFF time) is kept constant, a sound pressure fluctuation range ΔN of the operation sound of the injector 33 is reduced as its drive cycle C becomes shorter. In this manner, when the drive cycle C becomes shorter and the sound pressure fluctuation range ΔN is reduced, the operation sound of the injector 33 approaches continuous sound, so that a driver hardly feel audible fluctuation and hardly feel uncomfortable. In other words, by shortening the drive cycle C of the injector 33, the driver hardly feel uncomfortable for the operation sound of the injector 33.

The operation sound of the injector 33 is maximized slightly delayed from time of switching to a valve open state from a valve closed state, regardless of length of the drive cycle. Specifically, at the time of switching to the valve open state, the movable core collides with the fixed core to generate collision sound, so that the operation sound of the injector 33 is maximized. Then, since injection sound of hydrogen is gradually reduced, the operation sound of the injector 33 is gradually reduced in the drive cycle. In this case, when the drive cycle becomes longer, an attenuation width (a sound pressure width ΔN) of the operation sound is increased.

Further, in a case where an upstream pressure (primary side pressure) of the injector 33 is constant, the maximum operation sound of the injector 33 at the time of switching to the valve open state is substantially constant size, regardless of the length of the drive cycle. In contrast, when the upstream pressure (primary side pressure) of the injector 33 is increased, the entire operation sound including the maximum operation sound is increased (see FIG. 7).

The ejector 34 generates a negative pressure by ejecting with its nozzle new hydrogen from the injector 33, sucks anode off-gas in the pipe 34b by the negative pressure, mixes the new hydrogen with the anode off-gas, and ejects the mixed gas toward the anode flow path 12.

An outlet of the anode flow path 12 is connected to an inlet of the ejector 34 via the pipe 34b (fuel gas discharge passage, reaction gas discharge passage). Then, the anode off-gas containing hydrogen from the anode flow path 12 is adapted to be sucked by the ejector 34 through the pipe 34b. In this manner, hydrogen is adapted to be circulated through the anode flow path 12. Incidentally, a gas-liquid separator (not shown) for separating water entrained in the anode off-gas is provided in the pipe 34b.

The pipe 34b is connected in the middle to a pipe 42b through a pipe 35a, a purge valve 35, and a pipe 35b. The purge valve 35 is set to be opened by the ECU 70 when discharging (purging) impurities (vapor, nitrogen or the like) entrained in hydrogen circulating in the pipe 34b at a time of system start-up or at a time of power generation by the fuel cell stack 10. Then, the discharged anode off-gas (hydrogen) is adapted to be diluted with cathode off-gas while flowing through the pipe 42b, to be discharged to the outside of the vehicle.

Incidentally, the ECU 70 is set to determine that it is necessary to discharge the impurities, and to open the purge valve 35, for example, when voltage (cell voltage) of the unit cell 11 constituting the fuel cell stack 10 is equal to or lower than a predetermined cell voltage. The cell voltage is detected, for example, by a voltage sensor (cell voltage monitor) for detecting the voltage of the unit cell 11.

The pressure sensor 36 is attached on an inlet side of the anode flow path 12 of the pipe 34a. Then, the pressure sensor 36 is adapted to detect a pressure in the pipe 34a as an actual anode pressure (actual fuel gas pressure) of the anode flow path 12, to output the detected pressure to the ECU 70.

<Cathode System>

The cathode system includes a compressor 41 (oxidizing gas supply means) and a back pressure valve 42.

The compressor 41 is connected to an inlet of the cathode flow path 13 through the pipe 41a. When the compressor 41 is operated by a command from the ECU 70, air containing oxygen outside the vehicle is adapted to be sucked and compressed by the compressor 41, to be supplied to the cathode flow path 13 through the pipe 41a.

Revolution speed of the compressor 41 is increased as a requested power generation amount is increased. In this manner, air is adapted to be supplied to the cathode flow path 13 at a pressure and flow rate corresponding to the requested power generation amount.

The pipe 42a, the back pressure valve 42, and the pipe 42b are sequentially connected to an outlet of the cathode flow path 13. Then, the cathode off-gas from the cathode flow path 13 is adapted to be discharged to the outside of the vehicle through the pipe 42a and the like.

The back pressure valve 42 is a normally open valve composed of a butterfly valve or the like, and its open degree is controlled by the ECU 70. Specifically, when the opening degree of the back pressure valve 42 is reduced, air pressure (cathode pressure) in the cathode flow path 13 is increased.

<Power Consumption System>

A power consumption system includes a motor 51, a power controller 52, and a battery 53. The motor 51 is connected to an output terminal (not shown) of the fuel cell stack 10 via the power controller 52. The battery 53 is connected to the power controller 52. Incidentally, an inverter (a PDU: Power Drive Unit) is provided between the motor 51 and the power controller 52, and a contactor (an ON/OFF switch) is provided between the power controller 52 and the fuel cell stack 10.

The motor 51 is an external load using the fuel cell stack 10 and/or the battery 53 as a power source, and is a power force for generating a driving force of the fuel cell electric vehicle. Incidentally, the compressor 41, the shut-off valve 32, the injector 33, the purge valve 35, and the back pressure valve 42 also use the fuel cell stack 10 and/or the battery 53 as a power source.

The power controller 52 is a device for controlling charge/discharge of the battery 53 and electric power (output current, output voltage) generated by the fuel cell stack 10 by a command from the ECU 70, and includes an electronic circuit such as a DC/DC chopper.

The battery 53 is an assembled battery formed by combining a plurality of electric cells. The electric cell is, for example, a lithium-ion type cell.

<Other Devices>

An IG 61 is a start switch of the fuel cell electric vehicle (fuel cell system 1), and is disposed around a driver's seat. The IG 61 is connected with the ECU 70, and the ECU 70 is adapted to detect an ON signal/OFF signal of the IG 61.

An accelerator opening degree sensor 62 detects an accelerator opening degree (a depression amount of an accelerator) and outputs the detected accelerator opening degree to the ECU 70. Incidentally, as the accelerator opening degree is increased, the requested power generation amount to the fuel cell stack 10 is increased.

<ECU>

The ECU 70 is a control unit for electronically controlling the fuel cell system 1, and is configured to include a CPU, a ROM, a RAM, various interfaces, an electronic circuit, and the like. Then, the ECU 70 is adapted to control various devices and execute various processes according to a program stored therein.

The ECU 70 (control means) has a function of PWM-controlling (electronically controlling) the injector 33. Specifically, the ECU 70 has a function of controlling the injector 33 in any one of a normal mode, a drain mode, and a stop mode. Then, the normal mode corresponds to a first control step, and the drain mode corresponds to a second control step. The drain mode further includes a valve opening time extension step.

<Normal Mode>

Figure 4:
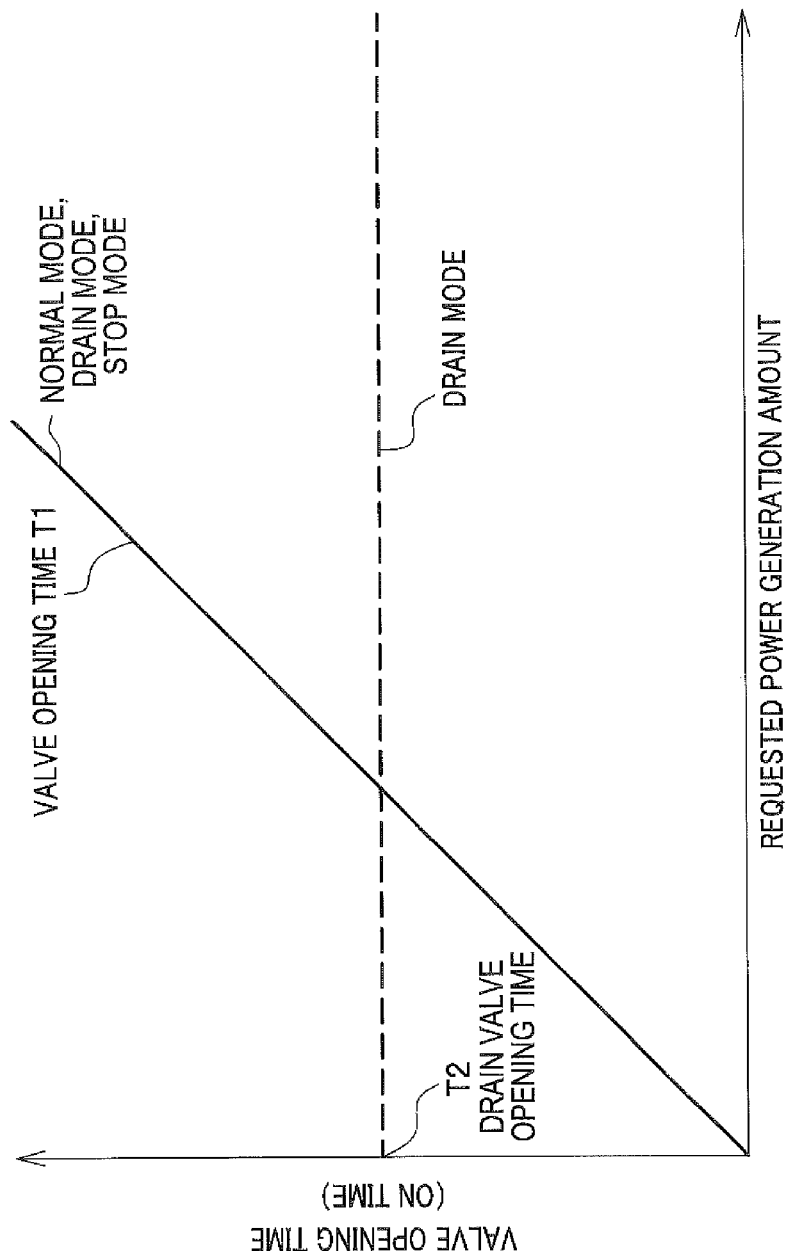
FIG. 4 is a map showing a relationship between a requested power generation amount and a valve opening time (an ON time) of the injector.

The normal mode is a mode to be performed (selected) during normal operation. As shown in FIG. 4, in the normal mode, as the requested power generation amount is increased, a valve opening time T1 (the ON time) of the injector 33 becomes longer. Thus, hydrogen is supplied to the fuel cell neither too much nor too little.

<Drain Mode>

Figure 5:
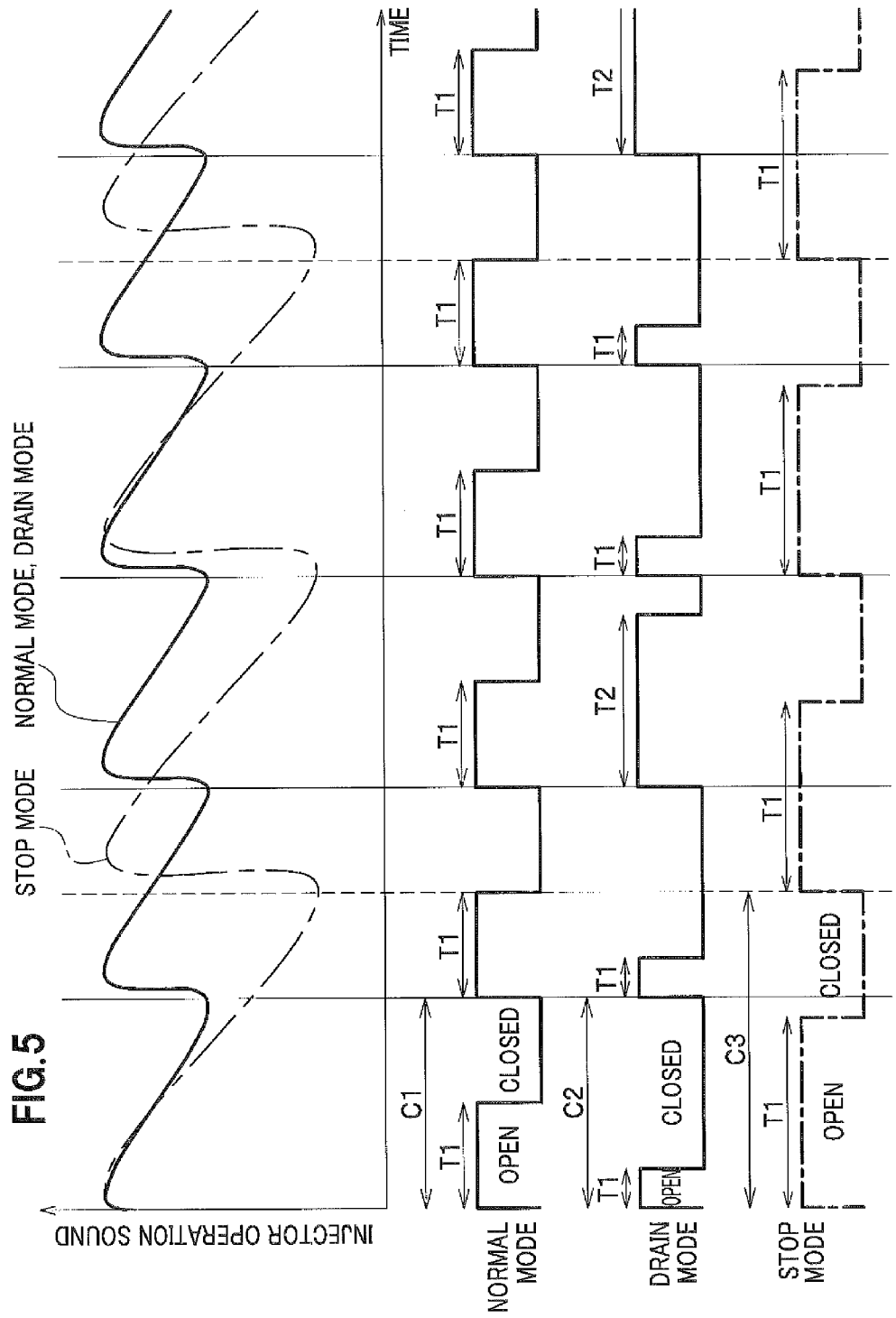
FIG. 5 is a time chart showing a relationship between the operation sound and an open/closed state of the injector.
Figure 6:
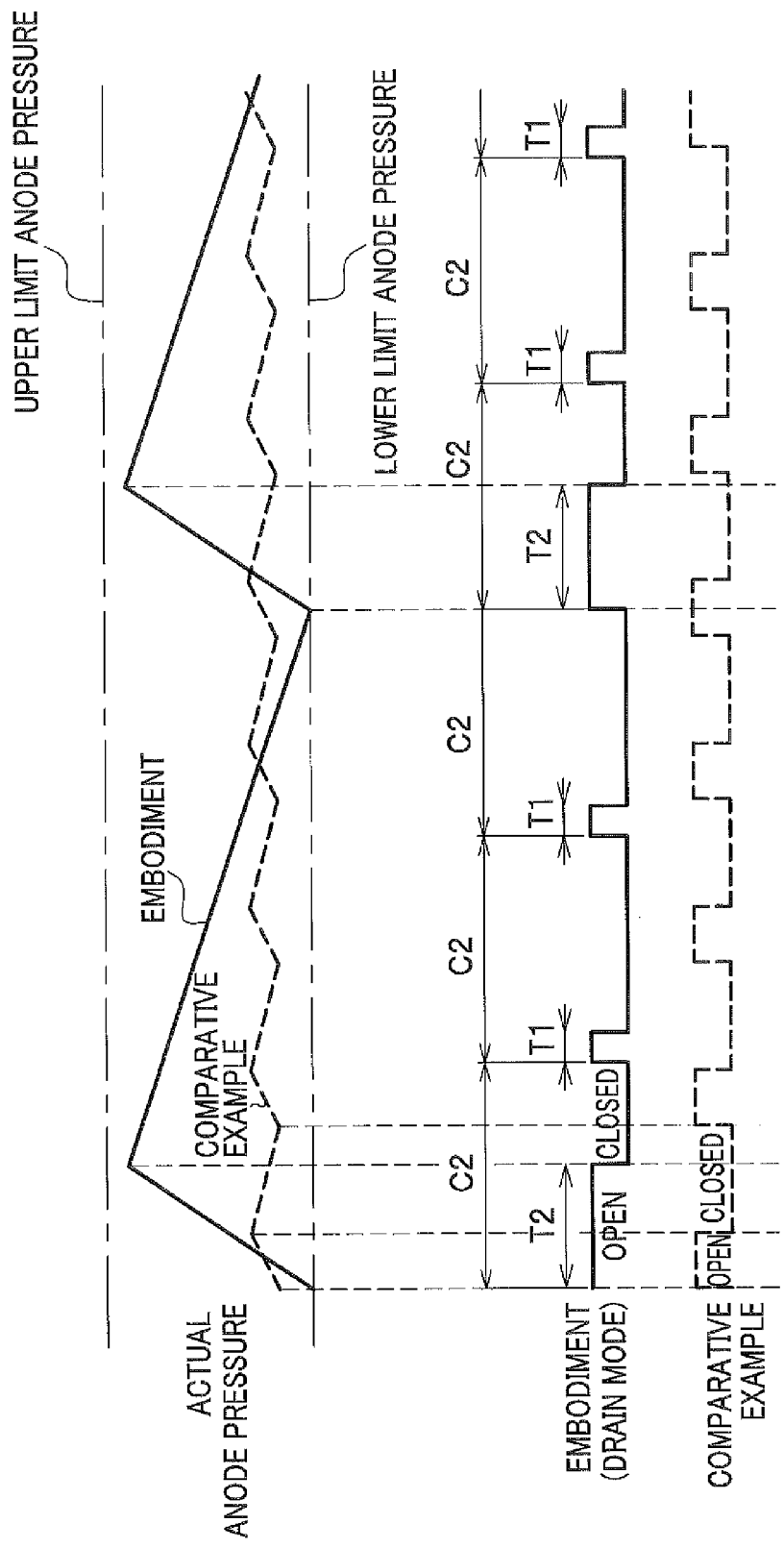
FIG. 6 is a time chart showing a relationship between an actual anode pressure and the open/closed state of the injector.

The drain mode is a mode to be performed (selected) in a case where it is determined that it is necessary to discharge water in the anode flow path 12. As shown in FIGS. 5, 6, in a repeating drive cycle C2, the drain mode is a mode in which the injector 33 is driven so as to basically inject hydrogen in the valve opening time T1 corresponding to the requested power generation amount (see FIG. 4), and so as to periodically inject hydrogen in a drain valve opening time T2 which is a constant fixed value regardless of the requested power generation amount.

That is, a step of injecting hydrogen in the drain valve opening time T2 which is a constant fixed value regardless of the requested power generation amount is the valve opening time extension step. That is, the drain valve opening time T2 which is a valve opening time during the valve opening time extension step is longer than the valve opening time T1 in its next and previous drive cycles. Further, after transiting to the drain mode, since the valve opening time extension step is periodically performed, and hydrogen is periodically injected in the drain valve opening time T2, water in the anode flow path 12 can be periodically discharged.

Incidentally, FIGS. 5, 6 illustrate, as an example, an injection pattern in which hydrogen is injected in the valve opening time T1 twice and periodically injected in the drain valve opening time T2 once, in the drain mode. However, the injection pattern is not limited thereto, and may be appropriately changed. For example, it may be an injection pattern in which hydrogen is injected alternately in the valve opening time T1 and in the drain valve opening time T2. Further, it may be an injection pattern in which hydrogen is not injected in the valve opening time T1, and is repeatedly and periodically injected only in the drain valve opening time T2.

Further, the injection pattern for injecting hydrogen in the valve opening time T1 or the drain valve opening time T2 in the drain mode may be configured (1) to be an injection pattern set in advance by a preliminary test or the like, or (2) to control a timing of driving the injector 33 in the drain valve opening time T2 on the basis of the actual anode pressure detected by the pressure sensor 36. Specifically, in a case where the actual anode pressure after injection is in a range not reaching an upper limit anode pressure even when the injector 33 is driven in the drain valve opening time T2, it may be configured to drive the injector 33 in the drain valve opening time T2. Note that, the upper limit anode pressure is set such that hydrogen concentration in a gas, which is discharged to the outside of the vehicle through the pipe 42b when opening the purge valve 35, is equal to or less than a predetermined dischargeable hydrogen concentration (see FIG. 6).

The drain valve opening time T2 is a time capable of discharging water staying in the anode flow path 12 to the outside of the anode flow path 12 by the pressure difference generated between the front and the back (between the inlet and the outlet) of the anode flow path 12 by opening the injector 33. The drain valve opening time T2 is determined by a preliminary test or the like, and the drain valve opening time T2 becomes longer, for example, when the anode flow path 12 becomes longer.

Further, the drain valve opening time T2 is set to a maximum valve opening time in the drive cycle C2 in the drain mode. That is, a minimum valve closing time is formed in the drive cycle C2 in the drain mode. In other words, the drive cycle C2 for injecting hydrogen in the drain valve opening time T2 in the drain mode is divided into the maximum valve opening time (drain valve opening time T2) and the minimum valve closing time. Since the drain valve opening time T2 is set to the maximum valve opening time in this manner, it is possible to quickly discharge water staying in the anode flow path 12. Further, since the minimum closing time is formed in the drive cycle C2, the injector 33 does not open across a current drive cycle and a next drive cycle, and the sound pressure width ΔN of the operation sound of the injector 33 is not increased too much.

Note that, a commanded valve opening time such as the drain valve opening time T2 to be commanded to the injector 33 is preferably added by a dead time (time lag) until the injector 33 actually injects hydrogen after command input.

<Drive Cycle in Normal Mode and Drain Mode>

A drive cycle C1 in the normal mode (first power generation amount range) and the drive cycle C2 in the drain mode (second power generation amount range) are set to be equal to each other (see FIGS. 5, 6). Thus, since the injector 33 is driven in the drive cycles equal to each other even when a mode transition occurs between the normal mode and the drain mode, the driver hardly feel uncomfortable by the operation sound of the injector 33.

<Stop Mode>

The stop mode is a mode to be performed (selected) during stop of the fuel cell system 1. As shown in FIG. 5, a drive cycle C3 in the stop mode is set to be longer than the drive cycle C1 in the normal mode (first power generation amount range) and the drive cycle C2 in the drain mode (second power generation amount range). As shown in FIG. 4, a stop valve opening time T3 of the injector 33 in the stop mode becomes longer, as the requested power generation amount is increased. The requested power generation amount in the stop mode is, for example, a power consumption of the compressor 41, which is required to pump air to bring the fuel cell stack 10 to a dry state, and a charge amount to bring the battery 53 to a filled state.

Thus, during stop of the fuel cell system 1, when the injector 33 is controlled in a long drive cycle C3 in the stop mode, the valve opening time T1 becomes long in a case where its duty ratio is equal to that in the normal mode and the drain mode. Therefore, injection amount of hydrogen from the injector 33 is increased, and the pressure difference between the front and the back of the anode flow path 12 is increased, so that water in the anode flow path 12 can be quickly discharged. Note that, although the drive cycle C3 and the stop valve opening time T3 become long as described above, the driver does not feel uncomfortable because it is during stop of the fuel cell system 1.

<<Operation of Fuel Cell System>>

Figure 2:
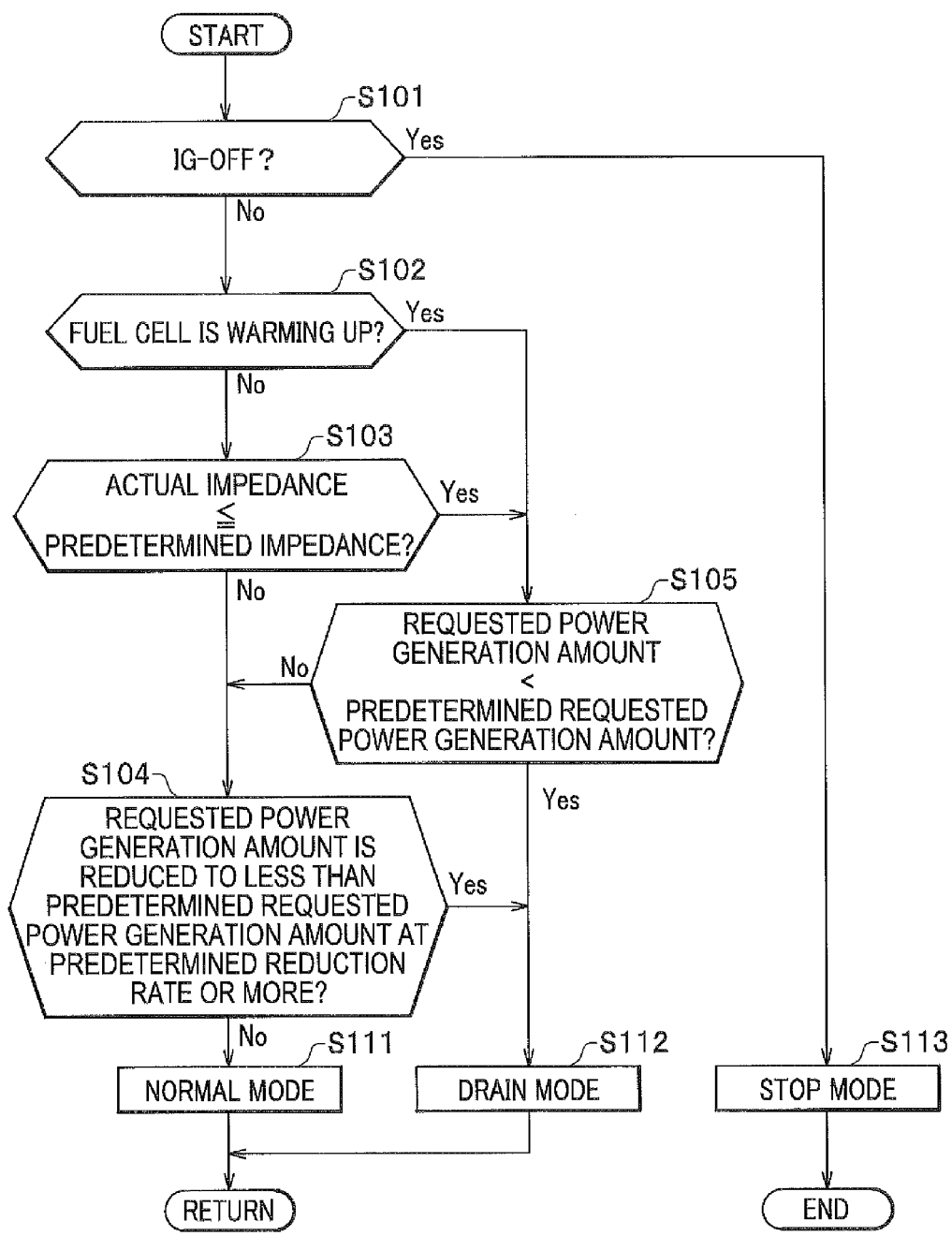
FIG. 2 is a flow chart showing an operation of the fuel cell system according to the embodiment of the present invention.

An operation of the fuel cell system 1 and a control method of the fuel cell system 1 will be described with reference to FIG. 2. The control method of the fuel cell system 1 includes a normal power generation step (first control step) in which the injector 33 is driven in a valve opening time which becomes longer as the requested power generation amount to the fuel cell stack 10 is increased, while the power generation amount is in the first power generation amount range, and a drain power generation step (second control step) in which the injector 33 is periodically driven in a drain valve opening time capable of discharging water staying in the anode flow path 12 regardless of the requested power generation amount to the fuel cell stack 10, while the power generation amount is in the second power generation amount range and the drive cycle of the injector 33 is equal to that in the normal power generation step.

Incidentally, the second power generation amount range is set to a range less than the first power generation amount range. In other words, an upper limit power generation amount (W2, power) in the second power generation range is set to be equal to or less than a lower limit power generation amount (W1, power) in the first power generation amount range. Further, in an initial state, hydrogen and air are supplied to the fuel cell stack 10, and the fuel cell stack 10 generates power corresponding to the requested power generation amount.

In Step S101, the ECU 70 determines whether or not to have detected the OFF signal (system stop command) of the IG 61. In other words, the ECU 70 performs a stop determination step of determining whether or not the fuel cell system 1 is in stop process. When the ECU 70 determines to have detected the OFF signal of the IG 61 (Yes in S101), it determines that the fuel cell system 1 is in stop process, and a process of the ECU 70 proceeds to Step S113. When the ECU 70 determines not to have detected the OFF signal of the IG 61 (No in S101), it determines that the fuel cell system 1 is not in stop process, and the process of the ECU 70 proceeds to Step S102.

In Step S102, the ECU 70 determines whether or not the fuel cell stack 10 is warming up. In other words, the ECU 70 performs a warm-up determination step of determining whether or not the fuel cell stack 10 is warming up. For example, when temperature Tw of a refrigerant discharged from the fuel cell stack 10 is equal to or higher than a predetermined warm-up completion temperature (70 to 80° C.), it is determined that the warm-up is completed. That is, when the temperature Tw of the refrigerant is lower than the predetermined warm-up completion temperature, it is determined that the fuel cell stack 10 is warming up. Incidentally, the refrigerant is circulated so as to pass through the fuel cell stack 10 in order to appropriately cool the fuel cell stack 10, and the temperature Tw of the refrigerant discharged from the fuel cell stack 10 is substantially equal to a temperature of the fuel cell stack 10.

When it is determined that the fuel cell stack 10 is warming up (Yes in S102), the process of the ECU 70 proceeds to Step S105. When it is determined that the warm-up of the fuel cell stack 10 is completed (No in S102), the process of the ECU 70 proceeds to Step S103.

In Step S103, the ECU 70 performs an impedance detection step of detecting the actual impedance, that is, detects the actual impedance of the fuel cell stack 10 via the impedance device 21, and determines whether or not the actual impedance is equal to or less than the predetermined impedance. The predetermined impedance is impedance corresponding to the over-humidification state of the electrolyte membrane, and is impedance by which it is determined that water discharge is required.

When it is determined that the actual impedance is equal to or less than the predetermined impedance (Yes in S103), the process of the ECU 70 proceeds to Step S105. When it is determined that the actual impedance is more than the predetermined impedance (No in S103), the process of the ECU 70 proceeds to Step S104.

In Step S104, the ECU 70 determines whether or not the requested power generation amount (W) is reduced to less than a predetermined requested power generation amount (W) at a reduction rate equal to or more than a predetermined reduction rate (W/s) in a predetermined time period (for example, 5 to 30 s) immediately before.

The predetermined time period, the predetermined reduction rate, and the predetermined requested power generation amount are determined by a preliminary test or the like, and are set to values by which it is determined that it is necessary to discharge a large amount of water staying in the anode flow path 12. The large amount of water stays in the anode flow path 12, because the hydrogen flow rate in the anode flow path 12 is suddenly reduced and drainage performance from the anode flow path 12 is deteriorated, when the requested power generation amount (W) is reduced to less than the predetermined requested power generation amount (W) at the reduction rate equal to or more than the predetermined reduction rate (W/s) in the predetermined time period (for example, 5 to 30 s) immediately before.

When it is determined that the requested power generation amount is reduced to less than the predetermined requested power generation amount at the reduction rate equal to or more than the predetermined reduction rate in the predetermined time period immediately before (Yes in S104), the process of the ECU 70 proceeds to Step S112. In other words, when reduction rate or reduction amount of the requested power generation amount is equal to or more than a predetermined value (Yes in S104), the valve opening time extension step is performed in Step S112. When it is determined that the requested power generation amount is not reduced to less than the predetermined requested power generation amount at the reduction rate equal to or more than the predetermined reduction rate in the predetermined time period immediately before (No in S104), the process of the ECU 70 proceeds to Step S111.

In Step S105, the ECU 70 determines whether or not the requested power generation amount is less than the predetermined requested power generation amount. The predetermined requested power generation amount is set to a value, which indicates that the hydrogen flow rate in the anode flow path 12 is reduced and it is necessary to discharge water in the anode flow path 12.

When it is determined that the requested power generation amount is less than the predetermined requested power generation amount (Yes in Step 105), the process of the ECU 70 proceeds to Step S112. When it is determined that the requested power generation amount is not less than the predetermined requested power generation amount (No in Step 105), the process of the ECU 70 proceeds to Step S104.

Here, a range in which the requested power generation amount is equal to or more than the predetermined requested power generation amount corresponds to the first power generation amount range. A range in which the requested power generation amount is less than the predetermined requested power generation amount corresponds to the second power generation amount range. That is, the second power generation amount range is set to a range less than the first power generation amount range.

<Normal Mode (Normal Power Generation Step)>

In Step S111, the ECU 70 controls the injector 33 in the normal mode. Then, the injector 33 injects hydrogen in the valve opening time T1 corresponding to the requested power generation amount (see FIGS. 4, 5). That is, in the first power generation amount range, the injector 33 supplies hydrogen in a longer valve opening time as the requested power generation amount is increased (see FIG. 4), at a predetermined drive cycle (see FIG. 5). In this manner, hydrogen is supplied to the anode flow path 12 at a pressure and flow rate corresponding to the requested power generation amount.

Then, the process of the ECU 70 returns to START via RETURN.

<Drain Mode (Drain Power Generation Step)>

In Step S112, the ECU 70 controls the injector 33 in the drain mode (see FIGS. 4 to 6). Then, the injector 33 periodically injects hydrogen in a preset constant drain valve opening time T2 regardless of the requested power generation amount. That is, in the second power generation amount range, the injector 33 periodically injects hydrogen in the drain valve opening time T2 while injecting hydrogen in the valve opening time T1 corresponding to the requested power generation amount in the drive cycle equal to that in the normal mode (S111, first power generation amount range). That is, in the drain mode, hydrogen is supplied in the drain valve opening time T2 longer than the valve opening time T1 in the next and previous drive cycles. Thus, a suitable pressure difference is generated between the front and the back of the anode flow path 12, so that water in the anode flow path 12 is discharged to the pipe 34b by the pressure difference as the driving force.

Further, since the drive cycle C2 in the drain mode is equal to the drive cycle C1 in the normal mode (see FIG. 5), the operation sound of the injector 33 approaches continuous sound, and the sound pressure fluctuation range $\Delta N$ is not much increased, and thus the driver does not feel uncomfortable.

Here, during performing the drain mode, when the actual anode pressure detected by the pressure sensor 36 is equal to or more than the upper limit anode pressure for a predetermined continuous time period (for example 2 to 5 s), the ECU 70 stops the drain mode and transits to the normal mode. In other words, when the ECU 70 further performs a pressure detection step of detecting the actual anode pressure in the anode flow path 12 in downstream of the injector 33, and the actual anode pressure is equal to or more than the upper limit anode pressure for the predetermined continuous time period, the ECU 70 does not perform the valve opening time extension step. The upper limit anode pressure is set such that hydrogen concentration in the gas, which is discharged to the outside of the vehicle through the pipe 42b when opening the purge valve 35, is equal to or less than the predetermined dischargeable hydrogen concentration (see FIG. 6). Further, when the actual anode pressure is equal to or more than the upper limit anode pressure, it may be configured to prohibit opening of the purge valve 35 for a predetermined prohibition time period.

In this manner, when the actual anode pressure is equal to or more than the upper limit anode pressure for the predetermined continuous time period, the ECU 70 transits to the normal mode from the drain mode, and thus thereafter a high concentration of hydrogen is not discharged to the outside of the vehicle.

Then, the process of the ECU 70 returns to START via RETURN.

<Stop Mode>

In Step S113, the ECU 70 controls the injector 33 in the stop mode (see FIGS. 4, 5). Then, since the injector 33 is driven in the long drive cycle C3, the valve opening time T1 tends to be long (see FIG. 5). Thus, a suitable pressure difference is generated between the front and the back of the anode flow path 12, so that water in the anode flow path 12 is discharged to the pipe 34b by the pressure difference as the driving force.

Then, the process of the ECU 70 proceeds to END, to be in a system stop state.

<<Effects of Fuel Cell System>>

As described above, during ON of IG 61, since the injector 33 operates in the drain mode (S112), it periodically injects hydrogen in the drain valve opening time T2 (see FIGS. 5, 6). Thus, a fluctuation range of the actual anode pressure is larger than that in a comparative example in which the normal mode only is repeated (see FIG. 6). Therefore, it is possible to suppress sound pressure fluctuation due to an operation of the injector 33 (see FIG. 5) while ensuring drain performance of the fuel cell stack 10, and thereby the driver hardly feel uncomfortable.

Further, in any one of cases where (1) the fuel cell stack 10 is warming up and the requested power generation amount is less than the predetermined requested power generation amount (Yes in S102, Yes in S105), (2) the actual impedance is equal to or less than the predetermined impedance and the requested power generation amount is less than the predetermined requested power generation amount (Yes in S103, Yes in S105), and (3) the requested power generation amount is reduced to less than the predetermined requested power generation amount at the reduction rate equal to or more than the predetermined reduction rate (Yes in S104), when it is determined that water discharge is required, the drain mode is performed (S112), and it is possible to quickly discharge water in the anode flow path 12.

<<Modification>>

Hereinabove, one embodiment of the present invention has been described, however, it is not limited thereto, and it may be modified as follows.

In the embodiment described above, a configuration in which the drive cycle C1 of the injector 33 in the normal mode and the drive cycle C2 of the injector 33 in the drain mode are equal to each other, has been described as an example (C1=C2), however, as another example, it may be configured such that the drive cycle C2 in the drain mode is shorter than the drive cycle C1 in the normal mode (C2<C1). With this configuration, an interval between the operation sounds of the injector 33 becomes short, so that the operation sound is continuous, and thus it is more difficult for the driver to feel uncomfortable.

In the embodiment described above, a configuration in which the drain valve opening time is the maximum valve opening time in the drive cycle in the drain mode, has been described as an example, however, as another example, it may be configured such that the drain valve opening time is set to a maximum valve opening time in a range where the anode pressure in the anode flow path 12 does not reach the upper limit anode pressure on the basis of the actual anode pressure detected by the pressure sensor 36. With this configuration, it is possible to satisfactorily prevent gas leakage from the fuel gas flow path 12 as well as to increase pulsation of the anode gas pressure, thereby satisfactorily discharging water in the anode gas flow path 12.

In the embodiment described above, a configuration in which the requested power generation amount (W) is calculated on the basis of the accelerator opening degree detected by the accelerator opening degree sensor 62, and the fuel cell system 1 is controlled on the basis of the requested power generation amount, has been described as an example, however, as another example, it may be configured such that the actual power generation amount (W) of the fuel cell stack 10 is calculated by using the voltage sensor and a current sensor, and the fuel cell system 1 is controlled on the basis of the actual power generation amount.

DESCRIPTION OF NUMERALS

1: fuel cell system
10: fuel cell stack (fuel cell)
11: unit cell (fuel cell)
12: anode flow path (fuel gas flow path)
21: impedance device (impedance detection means)
33: injector (fuel gas supply valve)
36: pressure sensor (fuel gas pressure detection means)
70: ECU (control means)
C: drive cycle of injector
C1: drive cycle in normal mode
C2: drive cycle in drain mode
C3: drive cycle in stop mode
T1: valve opening time in normal mode
T2: drain valve opening time in drain mode
T3: stop valve opening time in stop mode

The invention claimed is:

1. A fuel cell system comprising:
a fuel cell having a fuel gas flow path;
a fuel gas supply valve for supplying fuel gas at a predetermined drive cycle toward the fuel gas flow path by being opened; and
a control unit for controlling the fuel gas supply valve,
wherein the control unit performs a valve opening time extension step in which fuel gas is supplied in a valve opening time longer than that in next and previous drive cycles so that a larger amount of fuel gas is supplied to the fuel gas flow path in a current drive cycle than that in next and previous drive cycles.

2. The fuel cell system according to claim 1,
wherein the control unit further performs:
a first control step of performing fuel supply in a longer valve opening time as a power generation amount is increased at a predetermined drive cycle in a first power generation amount range;
a second control step of performing fuel supply in a drive cycle equal to that in the first power generation amount range, in a second power generation amount range less than the first power generation amount range; and
a valve opening time extension step in the second control step.

3. The fuel cell system according to claim 2,
wherein the control unit further performs:
a stop determination step of determining whether or not the fuel cell system is in stop process; and
a drive cycle extension step of controlling the fuel gas supply valve in a drive cycle longer than that in the first power generation amount range and the second power generation amount range regardless of power generation amount of the fuel cell, in a case where it is determined that the fuel cell system is in stop process in the stop determination step.

4. The fuel cell system according to claim 1,
wherein the control unit supplies fuel gas at a maximum valve opening time in the drive cycle regardless of power generation amount of the fuel cell during the valve opening time extension step.

5. The fuel cell system according to claim 1,
wherein the control unit supplies fuel gas at a maximum valve opening time in which a fuel gas pressure in the fuel gas flow path does not reach an upper limit fuel gas pressure regardless of power generation amount of the fuel cell during the valve opening time extension step.

6. The fuel cell system according to claim 1,
wherein the control unit further performs a pressure detection step of detecting an actual fuel gas pressure in the fuel gas flow path in downstream of the fuel gas supply valve, and
wherein the control unit does not perform the valve opening time extension step when the actual fuel gas pressure is continuously equal to or more than the upper limit fuel gas pressure for a predetermined time period.

7. The fuel cell system according to claim 1,
wherein the control unit further performs a warm-up determination step of determining whether or not the fuel cell is warming up, and
wherein the control unit performs the valve opening time extension step when the fuel cell is warming up.

8. The fuel cell system according to claim 1,
wherein the control unit further performs the valve opening time extension step when reduction rate or reduction amount of power generation by the fuel cell is equal to or more than a predetermined value.

9. The fuel cell system according to claim 1,
wherein the control unit further performs an impedance detection step of detecting an actual impedance of membrane constituting the fuel cell, and
wherein the control unit performs the valve opening time extension step when the actual impedance is equal to or more than a predetermined value.

10. The fuel cell system according to claim 1,
wherein the control unit periodically performs the valve opening time extension step.

11. A method of operating a fuel cell system comprising:
a fuel cell having a fuel gas flow path; a fuel gas supply valve for supplying fuel gas at a predetermined drive cycle toward the fuel gas flow path by being opened; and a control unit for controlling the fuel gas supply valve,
wherein the control unit performs a valve opening time extension step in which fuel gas is supplied in a valve opening time longer than that in next and previous drive cycles so that a larger amount of fuel gas is supplied to the fuel gas flow path in a current drive cycle than that in next and previous drive cycles.

12. The method of operating the fuel cell system according to claim 11,
wherein the control unit further performs:
a first control step of performing fuel supply in a longer valve opening time as a power generation amount is increased at a predetermined drive cycle in a first power generation amount range;

a second control step of performing fuel supply in a drive cycle equal to that in the first power generation amount range, in a second power generation amount range less than the first power generation amount range; and a valve opening time extension step in the second control step.

13. The method of operating the fuel cell system according to claim 11, wherein the control unit further performs:

a stop determination step of determining whether or not the fuel cell system is in stop process; and a drive cycle extension step of controlling the fuel gas supply valve in a drive cycle longer than that in the first power generation amount range and the second power generation amount range regardless of power generation amount of the fuel cell, in a case where it is determined that the fuel cell system is in stop process in the stop determination step.

14. The method of operating the fuel cell system according to claim 11, wherein the control unit supplies fuel gas at a maximum valve opening time in the drive cycle regardless of power generation amount of the fuel cell during the valve opening time extension step.

15. The method of operating the fuel cell system according to claim 11, wherein the control unit supplies fuel gas at a maximum valve opening time in which a fuel gas pressure in the fuel gas flow path does not reach an upper limit fuel gas pressure regardless of power generation amount of the fuel cell during the valve opening time extension step.

16. The method of operating the fuel cell system according to claim 11, wherein the control unit further performs a pressure detection step of detecting an actual fuel gas pressure in the fuel gas flow path in downstream of the fuel gas supply valve, and wherein the control unit does not perform the valve opening time extension step when the actual fuel gas pressure is continuously equal to or more than the upper limit fuel gas pressure for a predetermined time period.

17. The method of operating the fuel cell system according to claim 11, wherein the control unit further performs a warm-up determination step of determining whether or not the fuel cell is warming up, and wherein the control unit performs the valve opening time extension step when the fuel cell is warming up.

18. The method of operating the fuel cell system according to claim 11, wherein the control unit further performs the valve opening time extension step when reduction rate or reduction amount of power generation by the fuel cell is equal to or more than a predetermined value.

19. The method of operating the fuel cell system according to claim 11, wherein the control unit further performs an impedance detection step of detecting an actual impedance of membrane constituting the fuel cell, and wherein the control unit performs the valve opening time extension step when the actual impedance is equal to or more than a predetermined value.

20. The method of operating the fuel cell system according to claim 11, wherein the control unit periodically performs the valve opening time extension step.

* * * * *